UNITED STATES PATENT OFFICE.

BOTHO SCHWERIN, OF FRANKFORT-ON-THE-MAIN, GERMANY, ASSIGNOR TO ELEKTRO-OSMOSE AKTIENGESELLSCHAFT (GRAF SCHWERIN GESELLSCHAFT), OF FRANKFORT-ON-THE-MAIN, A CORPORATION.

PROCESS FOR THE TREATMENT OF CLAY AND KAOLIN BY ELUTRIATION.

1,233,713. Specification of Letters Patent. Patented July 17, 1917.

No Drawing. Application filed August 4, 1915. Serial No. 43,610.

*To all whom it may concern:*

Be it known that I, BOTHO SCHWERIN, a subject of the German Emperor, residing at Frankfort-on-the-Main, Germany, have invented certain new and useful Improvements in Processes for the Treatment of Clay and Kaolin by Elutriation, of which the following is a a specification.

When clays as they occur in nature, for instance crude kaolin or plastic clay, which are always admixed with particles of various other minerals, are suspended in water, the clay or kaolin may be obtained by elutriation in more or less pure condition and more or less satisfactory yield.

The deposits are, however, of a voluminous character and still contain much water. Even after standing for many weeks the deposit from a kaolin suspension, for instance, may still contain about 60 per cent. of water after supernatant water has been drawn off.

The present invention relates to an improvement in the elutriation process, whereby the material is obtained in a more solid condition, that is to say more free from water, the yield of pure material being at the same time considerably increased.

The invention consists in permitting the material to settle while it is in the sol condition. All materials which settle in this condition yield solid deposits. This solid form is due to a kind of electrical surface tension which not only expresses the water from between the several particles, so that a higher degree of dehydration of the respective layers is attained, but also, by the internal contraction of the deposit, expresses the finer suspensoids from between the deposited particles, so that the former are separated from the latter and remain in suspension. These suspended particles also gradually settle and afford further fractions of higher degree of fineness in solid form free from water. In this manner the yield is increased.

The invention will be further explained by reference to a kaolin suspension. The crude kaolin contains a considerable proportion of fine particles of other minerals, hereinafter termed slime, and the particles of kaolin are in part so finely united with the slime that they cannot be separated mechanically. When such a kaolin suspension is allowed to rest, a portion of the kaolin does indeed settle, but it forms a voluminous, spongy deposit, rich in water. After settling for several weeks, the water content of the deposited kaolin still amounts to about 60 per cent. Moreover, a large part of the kaolin is lost as it is carried to the bottom by the slime which retains it.

If, however, the suspended kaolin is caused to pass into the sol condition, that is, to undergo an increase in its degree of dispersion, by one of the methods usual in colloid chemistry and is allowed to stand, the aforesaid advantages arise. For the purpose of producing the sol condition there may, for example, be added to the suspension a small proportion of caustic soda lye or another basic electrolyte. In the case of indifferent substances it is preferable to add to the suspension a suitable colloid body in addition to a suitable electrolyte. Under these conditions, if the grinding has been sufficient, an increase in the degree of dispersion of both the kaolin and the slime occurs. First the impurities such as sand, mica and coarse constitutents settle from the suspension. Then the slime loses its collidal condition and settles fractionally in solid form, in high degree free from water. This also happens by degrees in the case of the kaolin, which gradually deposits fractionally in a hard form.

These fractions are compressed by a kind of electrical surface tension of the particles to a deposit or cake so solid that it contains only about 25–30 per cent. of water. This internal contraction of the cake of slime causes a firm deposition of the separate particles on each other without intermediate spaces, whereby the suspension between the particles is expressed from the cake so that fine particles of kaolin are expelled into the water and are subsequently deposited as another fraction. Owing to this phenomenon, the yield of kaolin increases; for the kaolin is now no longer incased and retained by the deposited slime as in the usual elutriation process. In the case of certain kinds of kaolin it is possible to obtain by the present invention an increased yield of 100 per cent. as compared with the usual elutriation.

*Example 1—Increasing the degree of dryness.*—When kaolin is elutriated by the usual technical methods, there is obtained after several weeks standing a deposit which, when the supernatant water has been drawn off, contains about 40 per cent. of dry substance. This deposit is of the consistance of a thick cream and is either, as is customary in England, dried until it contains about 10 per cent. of water, or freed from water in filter-presses. In the latter case the material removed from the press contains 70-75 per cent. of dry substance. According to the present invention, the kaolin is suspended in water and sodium silicate is added to it.

The following fractions were obtained:—

Residue 1: 138 kilos having 94.3 p.c. of dry substance.
" 2: 186 " " 81.2 " " " "
" 3: 26 " " 79.1 " " " "
" 4: 14 " " 78 " " " "

Residues 1 and 2 consisted of sand and slime and deposited, as will be apparent, in a much drier form than in the usual technical elutriation process, wherein the slime is completely fluid. Residues 3 and 4 consist of kaolin with 78-79 per cent. of dry substance, which is considerably higher than is obtained by filter pressing.

*Example 2—Increasing the yield.*—In order to show how by the present process the yield may be increased, the following example is adduced, namely of a washed slime, an industrial product, from which 39.4 per cent. of kaolin was obtainable which would have been lost by the usual process.

20 kilos of the slime were suspended in 40 liters of water and 150 c. c. of sodium silicate solution ($Na_2SiO_3$ 1 part, water 2 parts) were added.

Three fractions were obtained, namely:—

Fraction 1: 11.4 kilos=60 per cent.
" 2: 2.6 " =13.8 " "
" 3: 4.8 " =25.6 " "

Fraction 1 consisted of fine mineral particles (slime), fractions 2 and 3 were pure kaolin, coarse and fine respectively, together amounting to 39.4 per cent.

This quantity of kaolin therefore was rendered available by application of the present invention.

What I claim is:

1. A process of separating clay and kaolin from associated materials which comprises suspending in water the mixture to be treated, increasing the degree of dispersion of suspended matter, and allowing such matter to settle, the amount of water and the increase in the degree of dispersion being so proportioned as to produce a sediment having not more than about 30 per cent. of water.

2. A process of separating clay and kaolin from slime which comprises suspending clay and containing slime in water, increasing the degree of dispersion of both the slime and kaolin, and then allowing these materials to settle, and so proportioning the amount of water and the increase in the degree of dispersion as to effect a fractional sedimentation, and to produce a slime sediment substantially free from kaolin, and a kaolin sediment containing not more than about 30 per cent. of water.

In testimony whereof I affix my signature in presence of two witnesses.

BOTHO SCHWERIN.

Witnesses:
JEAN GRUND,
GUS HICHENTHAL.